United States Patent
Mori et al.

(10) Patent No.: US 6,337,961 B2
(45) Date of Patent: *Jan. 8, 2002

(54) PRINT CONTROL METHOD AND APPARATUS, AND PRINTER

(75) Inventors: Yasuo Mori, Tokyo; Koji Nakagiri, Kawasaki; Satoshi Nishikawa, Yokohama; Yasuhiro Kujirai, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/466,643

(22) Filed: Dec. 20, 1999

(30) Foreign Application Priority Data

Dec. 22, 1998 (JP) .............................. 10-365514

(51) Int. Cl.$^7$ .............................................. G03G 15/00
(52) U.S. Cl. .............................. 399/82; 399/77; 399/79
(58) Field of Search .............................. 399/75, 89, 80, 399/81, 82, 83

(56) References Cited

U.S. PATENT DOCUMENTS

| | | | | |
|---|---|---|---|---|
| 4,260,878 A | * | 4/1981 | Kawamura et al. | 399/80 |
| 5,066,977 A | * | 11/1991 | Yoshizuka | 399/82 |
| 5,802,423 A | * | 9/1998 | Ohunishi | 399/80 |
| 6,064,836 A | * | 5/2000 | Nakamura et al. | 399/8 |

* cited by examiner

Primary Examiner—Sophia S. Chen
Assistant Examiner—Hoang Ngo
(74) Attorney, Agent, or Firm—Fitzpatrick, Cella, Harper & Scinto

(57) ABSTRACT

A quotient (rounding up at one decimal place) obtained by dividing a user-designated number UNum of copies by a limit number PNum of copies unique to a printer is set as a number J of print jobs. PNum copies of print data obtained by one despool operation are printed. After printing of the PNum copies is performed (J−1) times, the number of copies for the final job (Jth job) is calculated. Since PNum×(J−1) copies have already been output at that time, N copies as the remainder of division of UNum by PNum suffice to be printed by the final job. Hence, the N copies are printed as the number of copies for the Jth print job, and printing is complete. This makes it possible to print the user-designated number of copies regardless of the printer limitation.

42 Claims, 19 Drawing Sheets

FIG. 8

| JOB-IDENTIFIABLE ID |
|---|
| PHYSICAL PAGE NUMBER OF PRINT PAGE |
| NUMBER n OF LOGICAL PAGES ASSIGNED TO PHYSICAL PAGE |
| FIRST LOGICAL PAGE NUMBER |
| ⋮ |
| nTH LOGICAL PAGE NUMBER |
| TOTAL NUMBER OF PAGES PER COPY BY JOB |

THREE COPIES ARE DISCHARGED TO EACH OF DISCHARGE PORTS 1 TO 8
{ DISCHARGE PORT 1
DISCHARGE PORT 2
DISCHARGE PORT 3
DISCHARGE PORT 4
DISCHARGE PORT 5
DISCHARGE PORT 6
DISCHARGE PORT 7
DISCHARGE PORT 8 }

DISCHARGE PORTS 9 AND 10 ARE KEPT UNUSED
{ DISCHARGE PORT 9
DISCHARGE PORT 10 }

PRINT CONTROL METHOD AND APPARATUS, AND PRINTER

BACKGROUND OF THE INVENTION

1. Field of the Invention

The present invention relates to a print control method and apparatus for controlling a printer, and a printer using the print control apparatus.

2. Description of the Related Art

Conventionally, when a plurality of copies of the same image data are to be printed by a print output apparatus (printer) using an information processing system (host), the print data is transferred to the printer the same number of times as the designated number of copies. For example, to output three copies of a 3-page document, data from the first to third pages are transferred three times from the host to the printer, as shown in FIG. 19. Transferring the same data three times decreases the printing processing efficiency.

To increase the printing processing efficiency, some printers comprise a spool device for storing print data. In such printer, data from the first to third pages are transferred once from the host, and stored in the internal spool device of the printer. The stored data is used a plurality of number of times (three times in the example of FIG. 19) to output a designated number of copies.

In a printer having a plurality of media discharge ports, it is possible that data from the first to third pages are transferred once from the host, and printed by changing the media discharge ports, by the number of copies, every time the printer receives each page data.

However, the number of copies printable by one print operation in the printer is limited. For example, assume that a plurality of copies are to be printed using the spool device. If the total capacity of print data exceeds the capacity of the spool device, the print data cannot be printed by one print operation. In some cases, the upper limit number of copies is determined by hardware limitations even for print data whose amount is equal to or smaller than the capacity of the spool device. For example, a printer having a plurality of media discharge ports can only print the same number of copies as the number of media discharge ports when the number of copies exceeding the number of media discharge ports is designated.

Some copying machines are free from this limitation by reading an original again when the number of copies exceeding the number of media discharge ports is designated. In a printer, however, no adequate solution is available for a print data size exceeding the capacity of the spool device.

In the prior art, therefore, when a user-requested number of copies exceeds the printer limit, the printer completely stops printing after it prints the limit number of copies, or does not print any data from the beginning.

SUMMARY OF THE INVENTION

The present invention has been made to overcome the conventional drawbacks, and has as its object to provide a print control method and apparatus capable of printing a user-requested number of copies even if the user-requested number of copies exceeds the printer limit number of copies, and a computer-readable memory storing a print control program.

According to one aspect of the present invention, the foregoing object is attained by providing a print control method comprising: a designation step of designating the number of copies by a user; a recognition step of recognizing a limit number of copies printable by one print operation; and a print control step of generating a job so as to make the number of copies printed by one job be not more than the limit number of copies recognized in the recognition step.

According to another aspect of the present invention, the foregoing object is attained by providing a print control apparatus comprising: designation means for designating the number of copies by a user; recognition means for recognizing a limit number of copies printable by one print operation; and print control means for dividing print data designated by the designation means into a plurality of jobs each for printing a number of copies not more than the limit number of copies recognized by the recognition means, and controlling printing so as to print the number of copies designated by the designation means by the plurality of jobs.

According to another aspect of the present invention, the foregoing object is attained by providing a print control apparatus comprising: designation means for designating print data and the number of copies of the print data by a user; recognition means for recognizing a limit number of copies printable by one print operation; and print control means for combining a plurality of print data designated by the user by the designation means to generate one pseudo print data, and generating a job for printing the limit number of copies of the pseudo print data.

According to another aspect of the present invention, the foregoing object is attained by providing a computer-readable memory storing a control program for controlling printing by a printer, comprising: a code of the input program of inputting the number of copies designated by a user; a code of the recognition program of recognizing a limit number of copies printable by one print operation; and a code of the print control program of dividing print data into a plurality of jobs each for printing a number of copies not more than the limit number of copies recognized by the recognition program, and controlling printing.

According to another aspect of the present invention, the foregoing object is attained by providing a computer-readable memory storing a control program for controlling printing by a printer, comprising: a code of the input program of inputting print data and the number of copies of the print data designated by a user; a code of the recognition program of recognizing a limit number of copies printable by one print operation; and a code of the print control program of combining a plurality of print data designated by the user by the designation program to generate one pseudo print data, and generating a job for printing the limit number of copies of the pseudo print data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing an example of a data format transferred in issuing a physical page print request from the spool file manager 304 to a despooler 305;

DETAILED DESCRIPTION OF THE PREFERRED EMBODIMENTS

Several preferred embodiments of the present invention will be described in detail below with reference to the accompanying drawings. The relative arrangements, formulas, numerical values, and the like of building components described in these embodiments do not limit the spirit and scope of the present invention, unless otherwise specified.

(First Embodiment)

Figure 1:
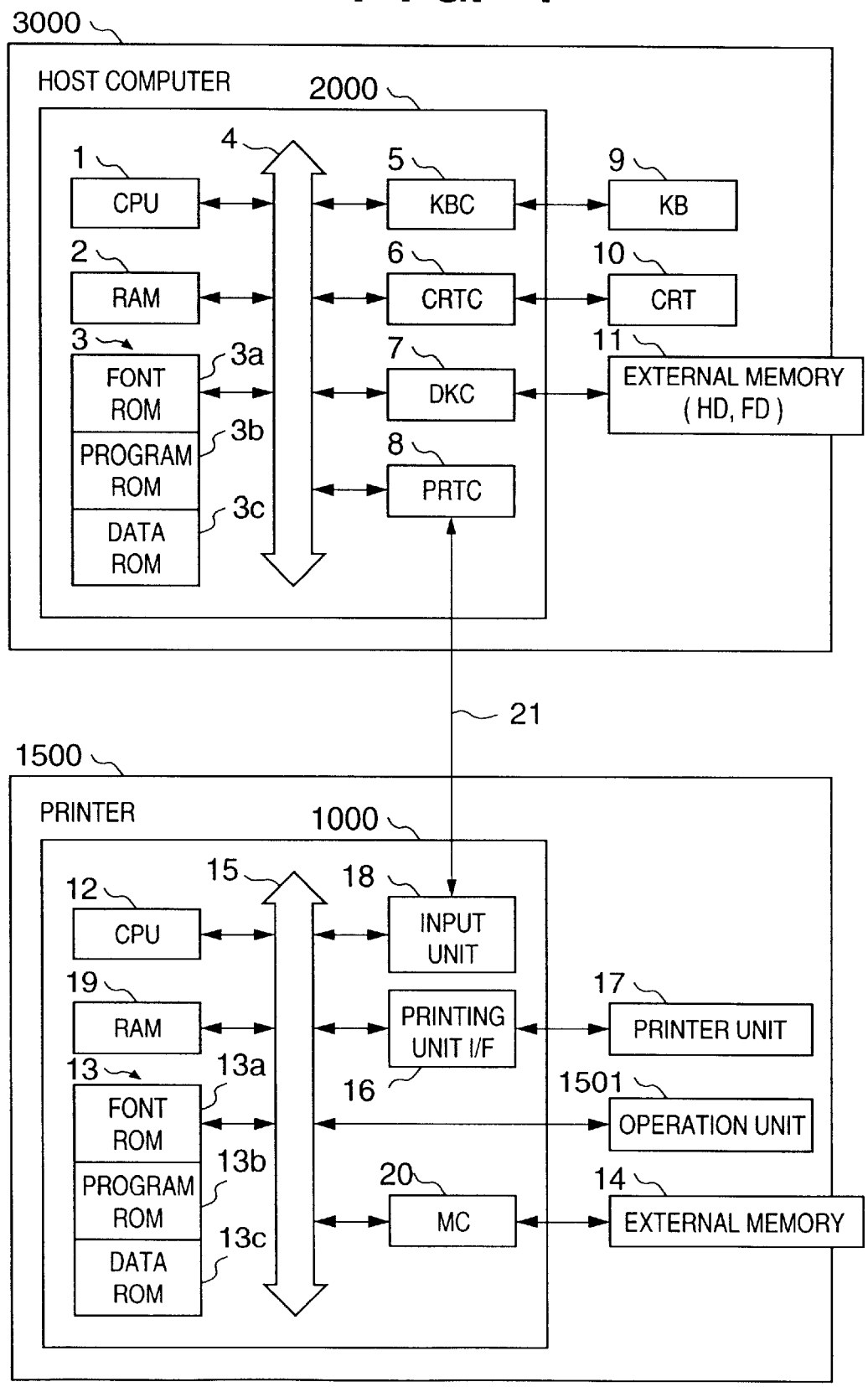
FIG. 1 is a block diagram for explaining a system, including a host computer and printer according to the first embodiment of the present invention.

The arrangement of a printer control system as an information processing system according to the first embodiment of the present invention will be explained with reference to the block diagram of FIG. 1.

The print control system according to the first embodiment is constituted by a host computer 3000 and printer 1500. The host computer 3000 comprises a CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and external memory 11.

The structures of the respective components of the host computer 3000 will be first described in detail. The CPU 1 is a central processing unit for integrally controlling respective devices connected to a system bus, and executes various processes for documents which include figures, images, characters, tables (including spreadsheets and the like), and the like on the basis of document processing programs stored in a program ROM 3b or the external memory 11. The CPU 1 executes, e.g., mapping (rasterizing) processing of an outline font to a display information RAM set on the RAM 2, and enables WYSIWYG (What You See Is What You Get: a function capable of printing data displayed on a CRT display screen with the displayed size and shape) on the CRT display 10.

Further, the CPU 1 opens various windows registered in advance and executes various data processes on the basis of commands instructed on the CRT display 10 with a mouse cursor. When a user is to print data using the printer 1500, he/she can open a window concerning print settings on the host side to set a print processing method for a printer driver including settings of the printer 1500 and selection of a print mode.

The RAM 2 functions as a main memory, work area, and the like for the CPU 1. The ROM 3 comprises a font ROM 3a, the program ROM 3b, and a data ROM 3c. The font ROM 3a or external memory 11 stores font data and the like used in document processing. The program ROM 3b or external memory 11 stores an operating system (to be referred to as an OS) and the like as control programs of the CPU 1. The data ROM 3c or external memory 11 stores various data used in document processing and the like.

The keyboard controller (KBC) 5 controls key inputs from the keyboard 9 and pointing device (not shown). The CRT controller (CRTC) 6 controls display on the CRT display (CRT) 10. The disk controller (DKC) 7 controls access to the external memory 11. The printer controller (PRTC) 8 is connected to the printer 1500 via a bi-directional interface 21, and executes communication control processing with the printer 1500. The keyboard 9 has various keys.

The CRT display (CRT) 10 displays figures, image characters, tables, and the like. The external memory 11 is realized by a hard disk (HD), floppy disk (FD), and the like, and stores boot programs, various applications, font data, user files, edit files, printer control command generation programs (to be referred to as printer drivers), and the like.

The above-described CPU 1, RAM 2, ROM 3, keyboard controller (KBC) 5, CRT controller (CRTC) 6, disk controller (DKC) 7, and printer controller (PRTC) 8 are arranged on a computer control unit 2000.

The structures of the respective components of the printer 1500 will be described in detail. A CPU 12 is a central processing unit for integrally controlling respective devices connected to a system bus 15, and outputs image signals as output information to a printer unit (printer engine) 17 on the basis of control programs and the like stored in a program ROM 13b of a ROM 13 or control programs and the like stored in an external memory 14. The CPU 12 can control communication processing with the host computer 3000 via an input unit 18 to notify the host computer 3000 of internal information of the printer 1500 and the like.

A RAM 19 functions as a main memory, work area, and the like for the CPU 12, and the memory capacity of the RAM 19 can be expanded by an option RAM to be connected to an expansion port. Note that the RAM 19 is used as an output information mapping area, environment data storage area, NVRAM, and the like. The ROM 13 comprises a font ROM 13a, the program ROM 13b, and a data ROM 13c. The font ROM 13a stores font data and the like used to generate output information. The program ROM 13*b* stores control programs and the like for the CPU 12. The data ROM 13*c* stores information used in the host computer 3000, the same as the external memory 14.

The input unit 18 allows exchanging data between the printer 1500 and host computer 3000 via the bi-directional interface 21. A printing unit interface (I/F) 16 allows exchanging data between the CPU 12 and printer unit 17. A memory controller (MC) 20 controls access to the external memory 14. The printer unit 17 performs print operation under the control of the CPU 12. An operation unit 1501 comprises switches for various operations, display means (e.g., an LED indicator), and the like.

The external memory 14 is realized by a hard disk (HD), IC card, and the like, and is optionally connected to the printer 1500. The external memory 14 stores font data, emulation programs, form data, and the like, and is accessed under the control of the memory controller (MC) 20. Note that the external memory 14 is not limited to one, and the printer 1500 can use a plurality of external memories 14. That is, the printer 1500 can be connected to a plurality of external memories 14 such as an optional card storing specific fonts to be used in addition to internal fonts, and an external memory storing programs for interpreting the printer control languages of different language systems. Further, the printer 1500 may adopt an NVRAM to store printer mode setting information from the operation unit 1501.

The above-described CPU 12, RAM 19, ROM 13, input unit 18, printing unit interface (I/F) 16, and memory controller (MC) 20 are arranged on a printer control unit 1000.

Figure 2:
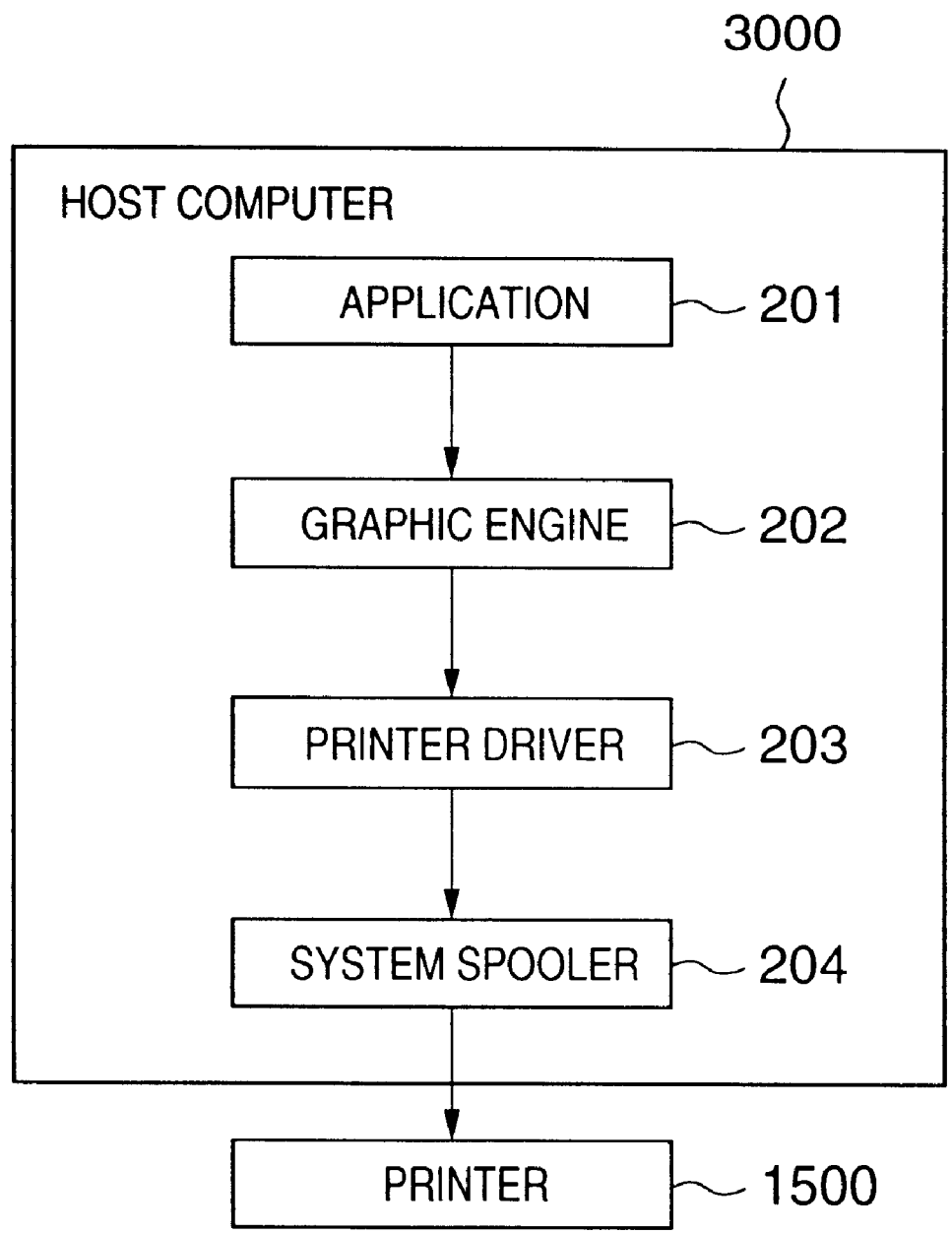
FIG. 2 is a block diagram of a print processing in the host computer according to the first embodiment of the present invention.

FIG. 2 is a block diagram showing the arrangement of typical print processing in the host computer connected to a printing apparatus such as a printer directly or via a network. In FIG. 2, an application 201, graphic engine 202, printer driver 203, and system spooler 204 exist as files saved in the external memory 11 in FIG. 1, and serve as program modules executed by loading them to the RAM 2 by an OS or modules using these modules in execution.

The application 201 and printer driver 203 can be additionally stored in an HD serving as an external memory 11 from an FD or CD-ROM serving as another external memory 11 or via a network (not shown). The application 201 saved in the external memory 11 is loaded to the RAM 2 and then executed. In printing data from the application 201 by the printer 1500, data is output (drawn) using the graphic engine 202 which is similarly loaded to the RAM 2 and can be executed.

The graphic engine 202 similarly loads the printer driver 203 prepared for each printing apparatus from the external memory 11 to the RAM 2, and sets an output from the application 201 to the printer driver 203. The graphic engine 202 transforms a GDI (Graphic Device Interface) function received from the application 201 into a DDI (Device Driver Interface) function, and outputs the DDI function to the printer driver 203. Based on the DDI function received from the graphic engine 202, the printer driver 203 converts a print instruction into a control command, such as a PDL (Page Description Language), which the printer can recognize. The converted printer control command is output as print data to the printer 1500 through the bi-directional interface 21 via the system spooler 204 loaded to the RAM 2 by the OS.

The print control system according to this embodiment has the print system of the host computer 3000 shown in FIG. 2, and in addition an arrangement of temporarily spooling print data from an application by intermediate code data.

Figure 3:
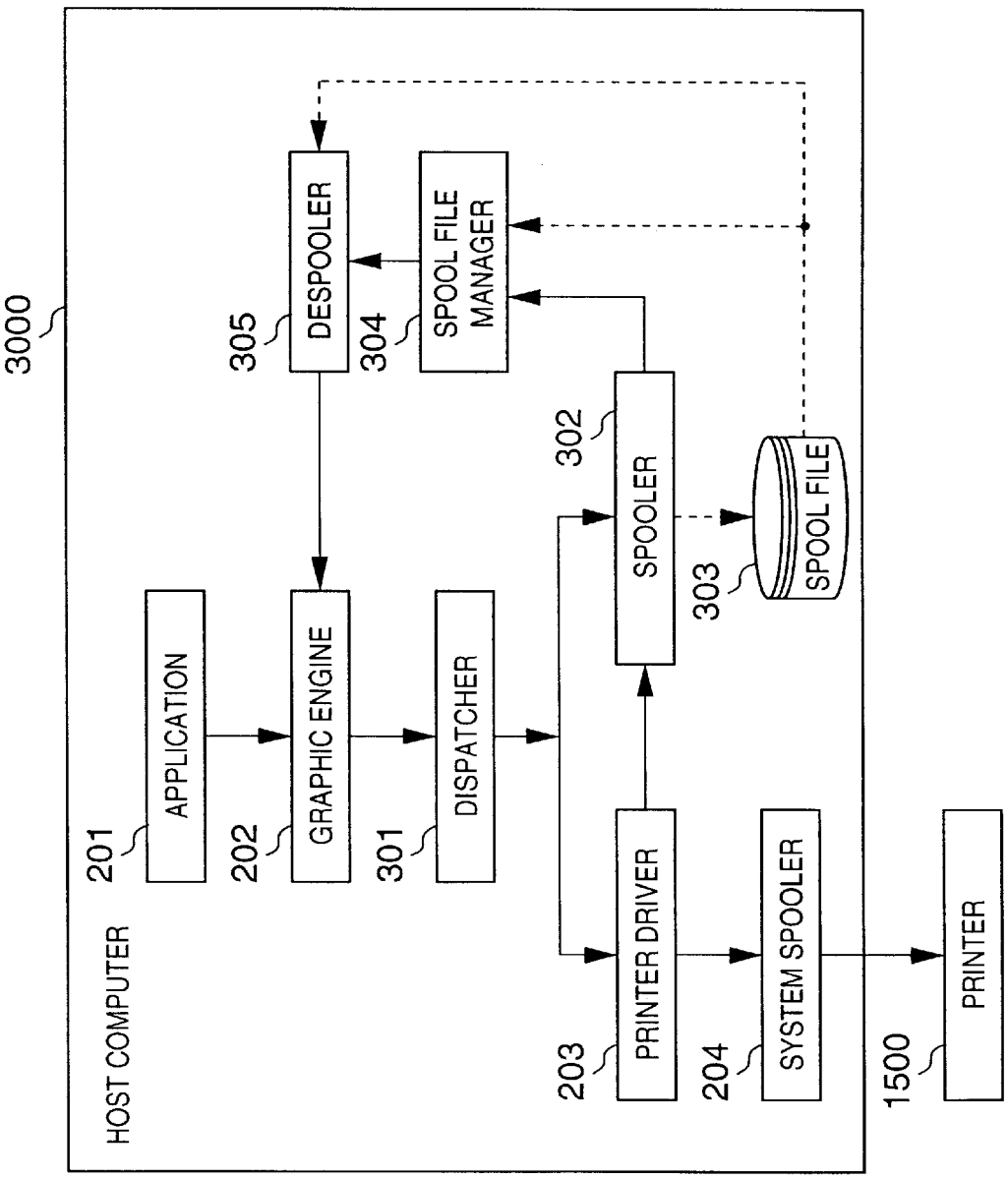
FIG. 3 is a block diagram for explaining print processing in the host computer, in detail, according to the first embodiment of the present invention.

FIG. 3 shows the modified arrangement of the system in FIG. 2 in which a spool file 303 made up of intermediate codes is temporarily generated in transmitting a print instruction from the graphic engine 202 to the printer driver 203.

In the system of FIG. 2, the application 201 is released from print processing after the printer driver 203 converts all print instructions from the graphic engine 202 into control commands for the printer 1500.

To the contrary, in the system of FIG. 3, the application 201 is released from print processing after a spooler 302 converts all print instructions into intermediate code data and outputs the intermediate code data to the spool file 303. In general, the processing time is shorter in the latter system. The system shown in FIG. 3 can process the contents of the spool file 303. This can realize a more advanced function than the function of the application, such as N-up processing of reducing a plurality of pages onto one page, in addition to simple enlargement/reduction processing for print data from the application.

To process print data, a user performs settings from a window provided by the printer driver 203, and the printer driver 203 saves the set contents in the RAM 2 or external memory 11.

Details in FIG. 3 will be explained. As shown in FIG. 3, in this expanded processing system, a dispatcher 301 receives a print instruction from the graphic engine 202. When the print instruction received by the dispatcher 301 from the graphic engine 202 is one issued by the application 201 to the graphic engine 202, the dispatcher 301 loads the spooler 302 stored in the external memory 11 into the RAM 2, and transmits the print instruction not to the printer driver 203 but to the spooler 302.

The spooler 302 converts the received print instruction into intermediate codes, and outputs them to the spool file 303. Also, the spooler 302 obtains, from the printer driver 203, process settings concerning print data set in the printer driver 203, and saves the settings in the spool file 303. Note that the spool file 303 is generated as a file in the external memory 11, but may be generated in the RAM 2. Further, the spooler 302 loads a spool file manager 304 stored in the external memory 11 to the RAM 2, and notifies the spool file manager 304 of the generation status of the spool file 303.

The spool file manager 304 determines whether or not printing can be performed in accordance with the contents of the process settings concerning the print data saved in the spool file 303. When the spool file manager 304 determines that printing can be performed using the graphic engine 202, the spool file manager 304 loads a despooler 305 stored in the external memory 11 into the RAM 2, and instructs the despooler 305 to perform print processing of the intermediate codes described in the spool file 303.

The despooler 305 processes the intermediate codes included in the spool file 303 in accordance with the contents of the process settings included in the spool file 303, and outputs the processed codes via the graphic engine 202 again. When the print instruction received by the dispatcher 301 from the graphic engine 202 is one issued from the despooler 305 to the graphic engine 202, the dispatcher 301 transmits a print instruction not to the spooler 302 but to the printer driver 203. The printer driver 203 generates a printer control command and outputs it to the printer 1500 via the system spooler 204.

Figure 4:
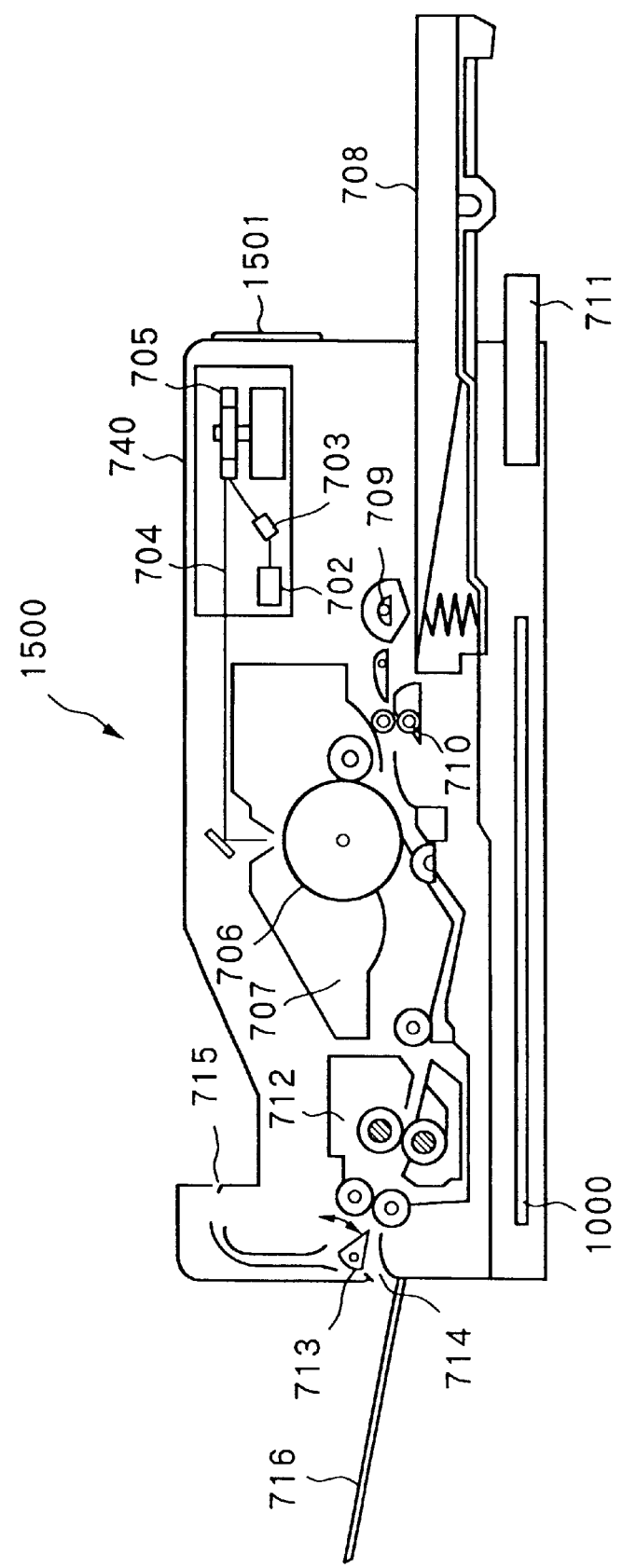
FIG. 4 is a sectional view for explaining a printer which can constitute both the host computer and print system according to the first embodiment of the present invention.

FIG. 4 is a sectional view showing the internal structure of the printer 1500 (laser beam printer; to be referred to as an LBP hereinafter) according to this embodiment.

In the printer 1500, an LBP main body 740 for forming an image on a print sheet serving as a print medium based on a supplied printer control command and the like comprises the printer control unit 1000, the operation unit 1501, a laser driver 702, a semiconductor laser 703, a rotary polygon mirror 705, an electrostatic drum 706, a developing unit 707, a sheet cassette 708, convey rollers 710, an external memory 711, a face-down media discharge portion 715, and delivery tray 716.

The structures and operations of the respective components will be described in detail. The printer control unit 1000 controls the entire LBP main body 740 and analyzes character pattern information and the like. The printer control unit 1000 mainly converts a printer control command into a video signal, and outputs the signal to the laser driver 702. The printer control unit 1000 is optionally connected to the external memory 711 for supplying font data, an emulation program of a page description language, and the like. The operation unit 1501 has operation switches, display means (e.g., an LED indicator), and the like, as described above.

The laser driver 702 is a circuit for driving the semiconductor laser 703, and turns on/off a laser beam 704 emitted by the semiconductor laser 703 in accordance with an input video signal. The semiconductor laser 703 emits a laser beam to the rotary polygon mirror 705. The rotary polygon mirror 705 oscillates the laser beam 704 right and left to scan the electrostatic drum 706. Scanning of the laser beam 704 forms an electrostatic latent image of a character pattern on the surface of the electrostatic drum 706.

The developing unit 707 surrounds a portion of the electrostatic drum 706, and develops the electrostatic latent image. After developing, the image is transferred onto a print sheet. The sheet cassette 708 stores, e.g., cut sheets as print sheets. A pickup roller 709 and the convey rollers 710 feed a print cut sheet in the sheet cassette 708 into the LBP main body 740, and supply the sheet to the electrostatic drum 706. In this case, a print cut sheet can also be supplied from a manual feed tray (not shown) attached to the upper surface of the lid of the sheet cassette 708.

A fixing unit 712 heats the toner image transferred to a print cut sheet to fix the image onto the print cut sheet. When a switching wedge 713 is positioned up, the print sheet having the image is discharged from a face-up media discharge portion 714 to the delivery tray 716 with the print surface facing up. When the wedge 713 is positioned down, the print sheet is discharged from the face-down media discharge portion 715 with the print surface facing down.

Figure 5:
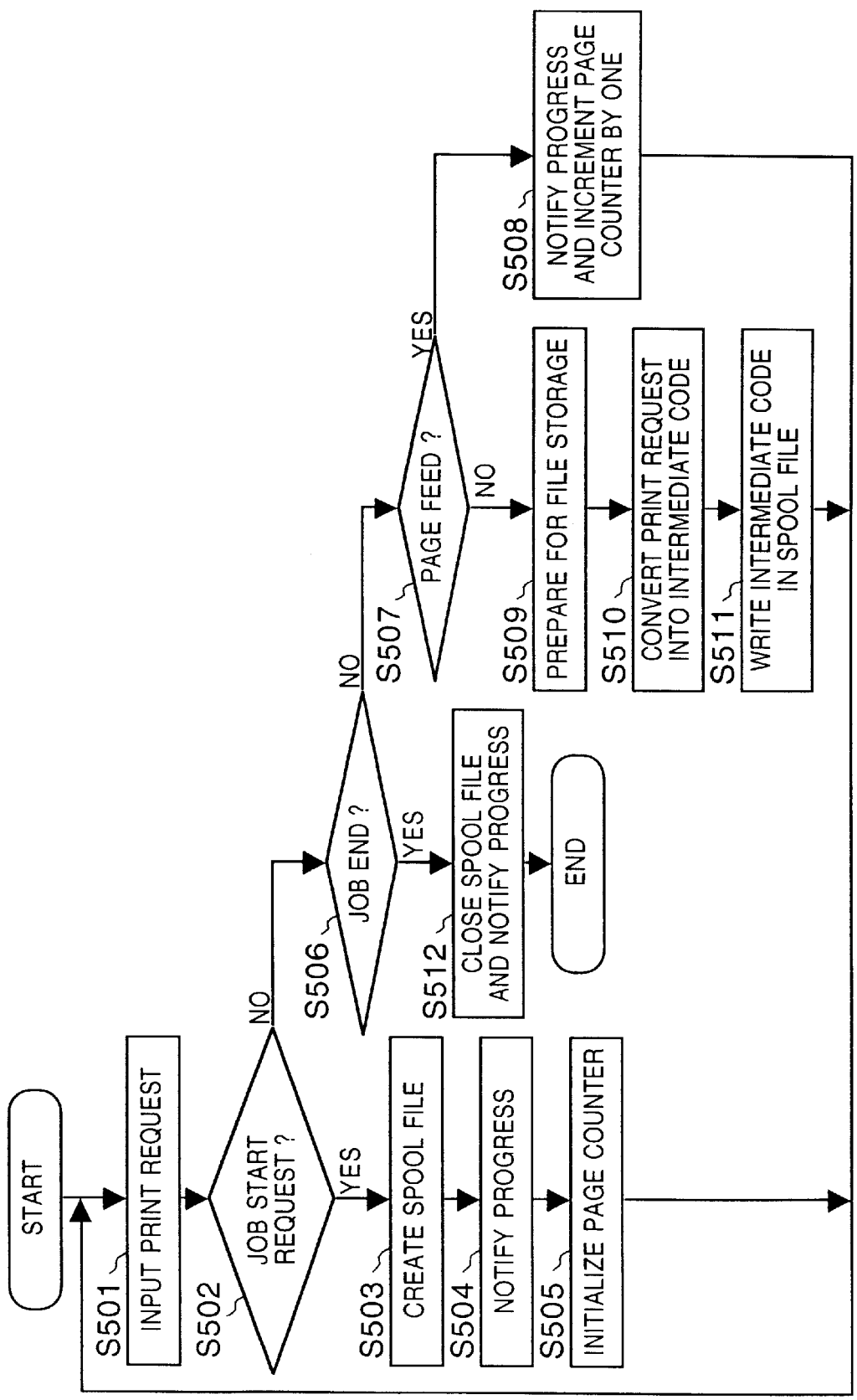
FIG. 5 is a flow chart showing processing in a spooler 302.

FIG. 5 is a flow chart showing page-unit save processing in generating the spool file 303 in the spooler 302.

Figure 6:
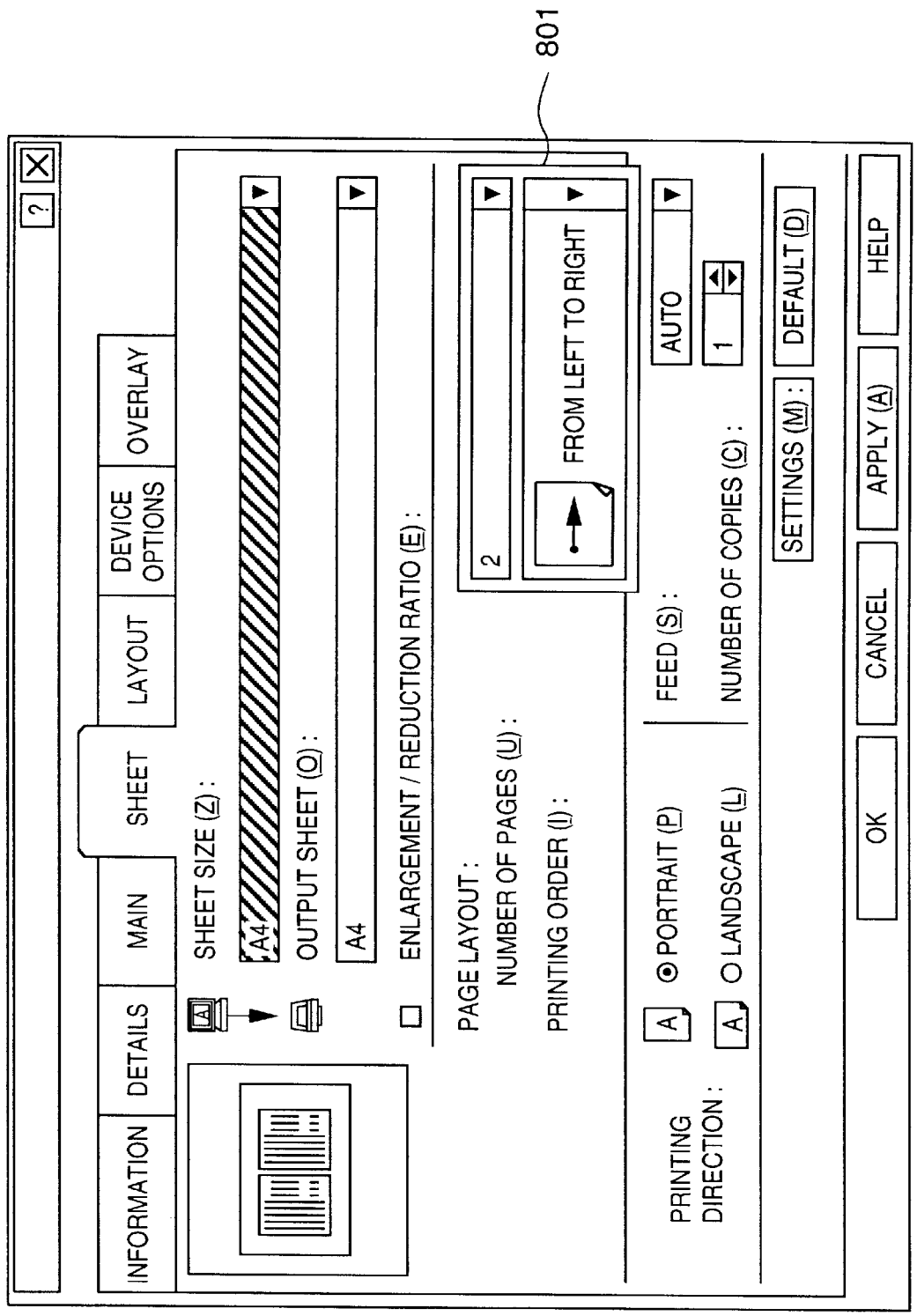
FIG. 6 is a view showing an example of a print setting window.

In step S501, the spooler 302 accepts a print request from the application. In the application, a dialog, like the one shown in FIG. 6, for inputting print settings is displayed, and print settings input from this dialog are outputted by the printer driver to the spooler 302. The setting input dialog shown in FIG. 6 includes, e.g., a setting item, like an item 801, for determining the number of logical pages to be laid out on one physical page.

In step S502, the spooler 302 checks whether or not the accepted print request is a job start request. If YES in step S502, the spooler 302 shifts to step S503 to create a spool file 303 for temporarily storing intermediate data. The spooler 302 notifies the spool file manager 304 of the progress of print processing in step S504, and initializes the page number counter of the spooler 302 to one in step S505. The spool file manager 304 reads the job information and process settings of the job being printed from the spool file 303, and stores them.

If NO in step S502, the spooler 302 shifts to step S506.

In step S506, the spooler 302 checks whether or not the accepted request is a job end request. INFO instep S506, the spooler 302 advances to step S507 to check whether or not the request is page feed. If YES in step S507, the spooler 302 advances to step S508 to notify the spool file manager 304 of the progress of print processing. Then, the spooler 302 increments the page number counter.

If NO in step S507, the spooler 302 shifts to step S509 to prepare for a write of the intermediate file.

In step S510, the spooler 302 performs conversion processing for storing the print request in the spool file 303. In step S511, the spooler 302 writes in the spool file 303 the print request converted in step S510. The spooler 302 returns to step S501 to accept a print request from the application again. The spooler 302 continues a series of processes from step S501 to S511 until it receives a job end request from the application. If YES in S506, all print requests from the application are complete. Thus, the spooler 302 advances to step S512 to notify the spool file manager 304 of the progress of print processing, and end the processing.

Figure 7:
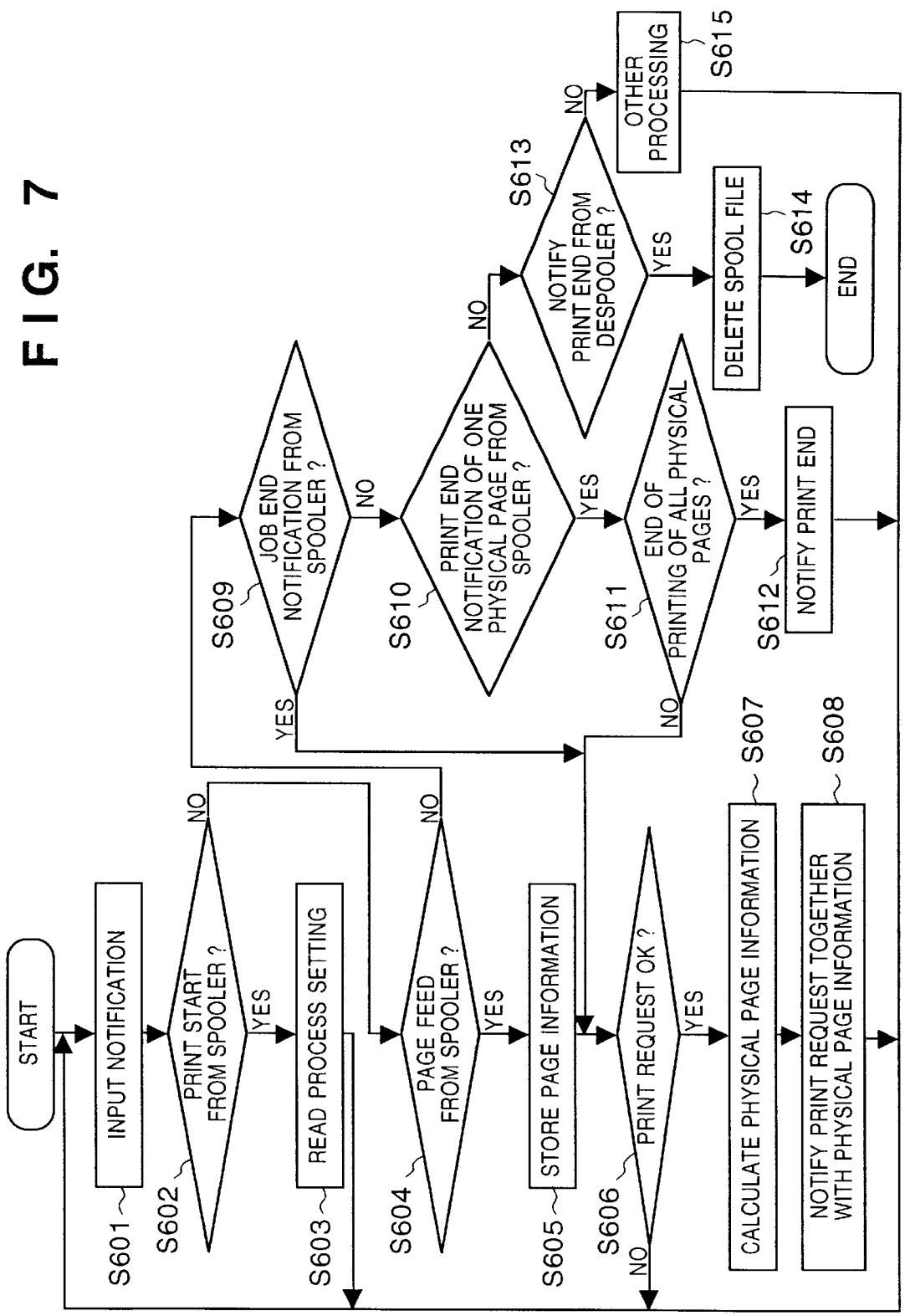
FIG. 7 is a flow chart showing print control and determination of a physical page number in a spool file manager 304.

FIG. 7 is a flow chart showing detailed control between generation process of the spool file 303 and print data generation process (to be described below) in the spool file manager 304.

In step S601, the spool file manager 304 accepts a progress notification of print processing from the spooler 302 or despooler 305.

In step S602, the spool file manager 304 checks whether or not the progress notification is a print start notification received from the spooler 302 in step S504 described above. If YES in step S602, the spool file manager 304 advances to step S603 to read print process settings from the spool file 303 and start managing the job. If NO in step S602, the spool file manager 304 advances to step S604 to check whether or not the progress notification is a print end notification, by which the spooler 302 notify an end of print of one logical page, in step S508. If YES in step S604, the spool file manager 304 shifts to step S605 to store logical page information of the logical page. In step S606, the spool file manager 304 checks whether or not printing of one physical page can start with respect to n logical pages having been spooled at this time. If YES in step S606, the spool file manager 304 advances to step S607 to determine a physical page number from the number of logical pages assigned to one physical page to be printed.

As for calculation of a physical page, for example, if process settings represent that four logical pages are laid out on one physical page, the first physical page can be printed when the fourth logical page is spooled, and the second physical page can be printed when the eighth logical page is spooled.

Even if the total number of logical pages is not a multiple of the number of logical pages to be laid out on one physical page, logical pages to be laid out on one physical page can be determined by a spool end notification in step S512.

In step S608, the spool file manager 304 notifies the despooler 305 by a format as shown in FIG. 8 of information such as logical page numbers constituting a physical page which can be printed, and the physical page number. Subsequently, the spool file manager 304 returns to step S601 to wait for a next notification. In this embodiment, when one page of print data is spooled, i.e., logical pages constituting one physical page are spooled, print processing can start even if all print jobs have not been spooled.

If NO in step S604, the spool file manager 304 shifts to step S609 to check whether or not the progress notification is a job end notification received from the spooler 302 in step S512 described above. If YES in step S609, the spool file manager 304 advances to step S606; if NO in step S609, to step S610 to check whether or not the accepted notification is a print end notification of one physical page from the despooler 305. If YES in step S610, the spool file manager 304 shifts to step S611 to check whether or not all physical pages, set in process settings, have been printed. If YES in step S611, the spool file manager 304 shifts to step S612 to notify the despooler 305 of the completion of printing; if NO in step S611, to step S606. The despooler 305 in this embodiment assumes that the number of physical pages to be simultaneously printed is 1.

If NO in step S610, the spool file manager 304 shifts to step S613 to check whether or not the accepted notification is a print end notification from the despooler 305. If YES in S613, the spool file manager 304 advances to step S614 to delete the spool file 303 and end the processing. If NO in step S613, the spool file manager 304 advances to step S615 to perform the other normal processing and wait for a next notification.

Figure 9:
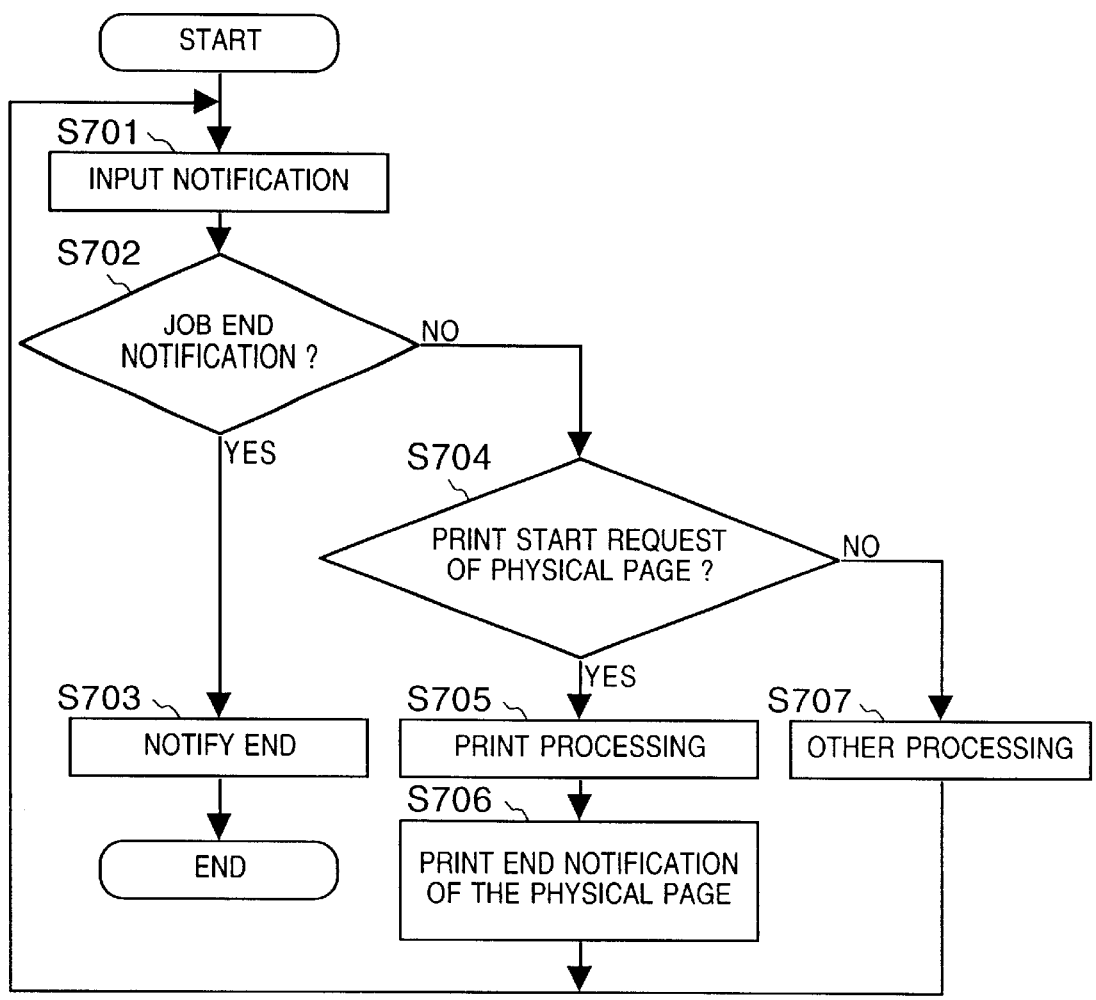
FIG. 9 is a flow chart showing processing in the despooler 305.

FIG. 9 is a flow chart showing print data generation process in the despooler 305 in detail.

The despooler 305 reads out necessary information from the spool file 303 to generate print data in accordance with a print request from the spool file manager 304. The generated print data is transferred to the printer according to the method described above with reference to FIG. 3.

In generating print data, the despooler 305 receives a notification from the spool file manager 304 in step S701. In step S702, the despooler 305 checks whether or not the input notification is a job end notification. If YES in step S702, the despooler 305 shifts to step S703 to notify the spool file manager 304 of the processing end notification of the despooler 305 and end the processing. If NO in step S702, the despooler 305 shifts to step S704 to check whether or not a print start request of one physical page in step S608 is received. If YES in step S704, the despooler 305 shifts to step S705 to read and print information necessary for generating print data of a designated physical page from the spool file 303 and information shown in FIG. 8 transferred from the spool file manager 304. In the print processing, the despooler 305 converts a print request instruction stored in the spool file 303 into a format which the graphic engine 202 can recognize, and transfers the converted instruction. In process settings of laying out a plurality of logical pages on one physical page, in this embodiment, the despooler 305 converts the instruction in consideration of a reduction layout in this step. At this time, the despooler 305 reads the page number addition information saved in the spool file 303 in a format as shown in FIG. 8, and adds a page number to a predetermined position.

If necessary print processing is complete, the despooler 305 notifies in step S706 the spool file manager 304 that print data of one physical page has been generated. Then, the despooler 305 returns to step S701 to wait for a next notification.

If NO in step S704, the despooler 305 shifts to step S707 to perform the other normal processing, and returns to step S701 to wait for a next notification.

Figure 10:
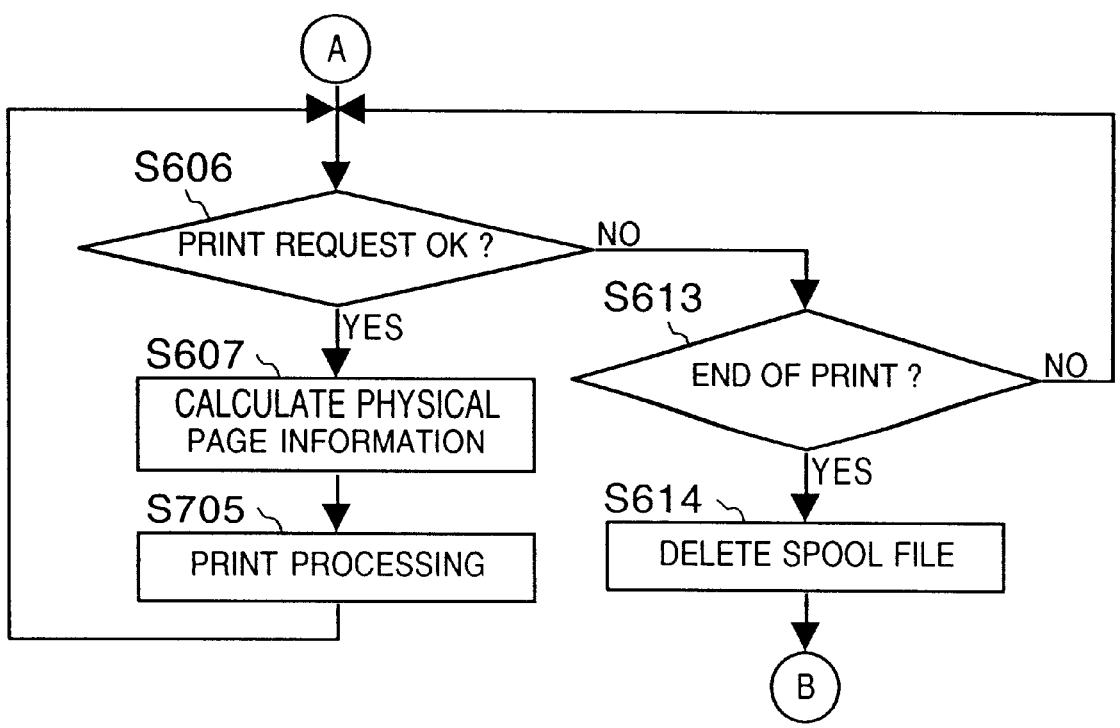
FIG. 10 is a flow chart showing print processing extracted from FIGS. 5 and 6.

FIG. 10 is a flow chart showing print processing extracted from the processes of the spool file manager and despooler in FIGS. 7 and 9. The same step numbers as in FIGS. 6 and 7 denote the same steps in FIG. 10. To put it briefly, print processing can be expressed by the following steps.

The flow shifts to step S705 to repeat print processing for respective physical pages until the end of printing is determined in step S613. If YES in step S613, the spool file is deleted in step S614, and the processing ends.

Figure 11:
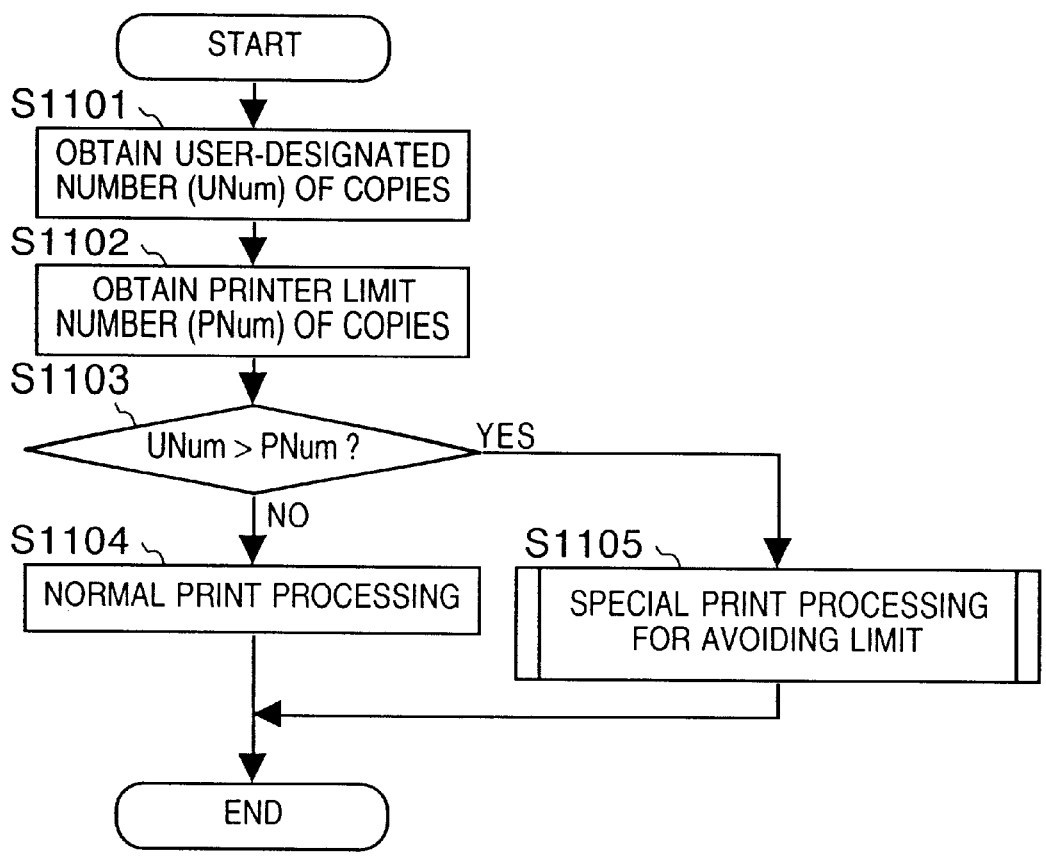
FIG. 11 is a flow chart showing an example of adding processing of the present invention to the processing in FIG. 10.

FIG. 11 is a flow chart showing the case of practicing the printing method of the present invention in conventional print processing. To avoid the printer limit, the printer limit must be assumed. This embodiment assumes a printer which ignores designation of the number of copies exceeding the printer limit, and rounds the designated number of copies to the printer limit number of copies.

In step S1101, a user-designated number (UNum) of copies is obtained. This value is generally set on a print dialog displayed in printing data from an application.

In step S1102, a printer limit number (PNum) of copies is obtained. When this value is unique to a printer, a table for a printer name and the limit number of copies is prepared, and the table is looked up based on a target output printer name to obtain the unique value. Alternatively, if the printer and host can communicate with each other, the host inquires the printer before printing to obtain the unique value. The unique value may be obtain with information for notifying the absence of sheets in the printer.

The flow shifts to step S1103 to compare the user-designated number of copies with the printer limit. If the user-designated number of copies falls within the printer limit as a result of comparison, the printer limit need not be considered. Hence, the flow shifts to step S1104 to perform normal print processing. This step S1104 corresponds to processing from A to B in FIG. 10.

If the user-designated number of copies exceeds the printer limit, the flow advances to step S1105 to perform special processing in order to avoid the printer limit.

Figure 12:
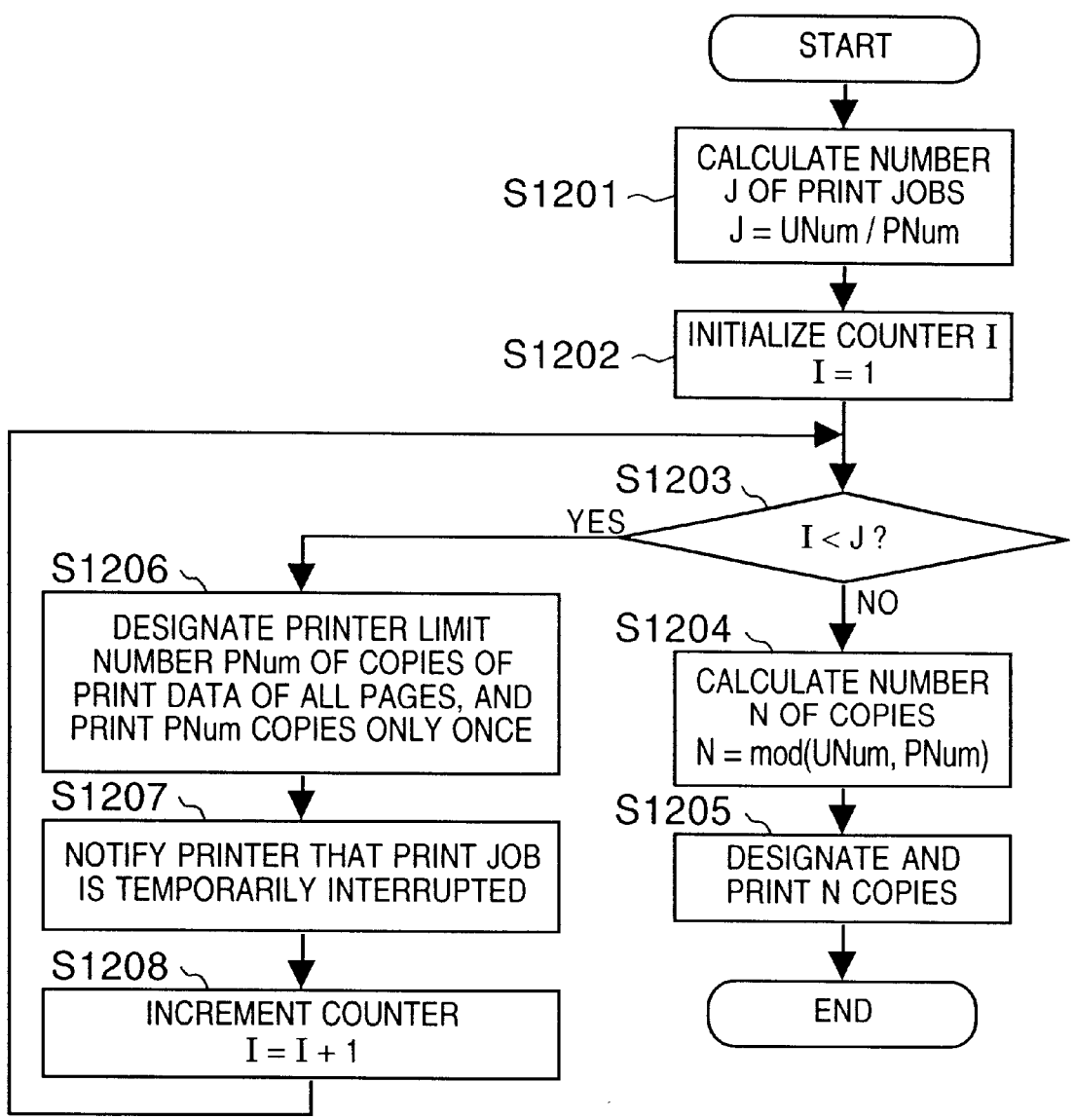
FIG. 12 is a flow chart for explaining processing unique to the present invention in more detail.

FIG. 12 is a flow chart for explaining special processing for avoiding the printer limit in step S1105 of FIG. 11.

In this embodiment, since only up to PNum copies can be printed at maximum by one print job, printing must be repeated a plurality of number of times in order to print the user-designated number of copies.

In step S1201, a number J of print jobs is calculated. The number of print jobs is the quotient (raising decimals to the next whole number) of UNum by PNum.

In step S1202, a loop counter I for repeating printing by the number J of print jobs is initialized.

In step S1203, the counter I is compared with the number J of print jobs. If the counter I does not reach the number J of print jobs, the flow shifts to processing from step S1206 to S1208.

In step S1206, print data obtained by one despool operation is printed by PNum copies as the upper printer limit. This print processing has been described with reference to FIGS. 1 to 11.

After all print data are printed, the printer is notified in step S1207 that the print job ends temporarily, and printing ends temporarily.

At the same time, the print counter I is incremented by one in step S1208, and the flow returns to step S1203.

Until I exceeds J, i.e., printing of PNum copies is executed (J-1) times, processing from step S1206 to S1208 is repeated.

If the final job (Jth job) is determined in step S1203, the flow advances to step S1204 to calculate the final number of copies. Since PNum×(J-1) copies have already been output at that time, the final number of copies is set to N as the remainder of division of UNum by PNum.

The flow shifts to step S1205 to print N copies by the Jth print job, and the printing ends.

It is also possible that, in dividing UNum by PNum in calculation of step S1201, a quotient J1 and remainder N1 are obtained, processing from step S1206 to S1208 is repeated only J1 times (J1 print jobs each for PNum copies are generated), and a print job for N1 copies are generated.

Figure 13:
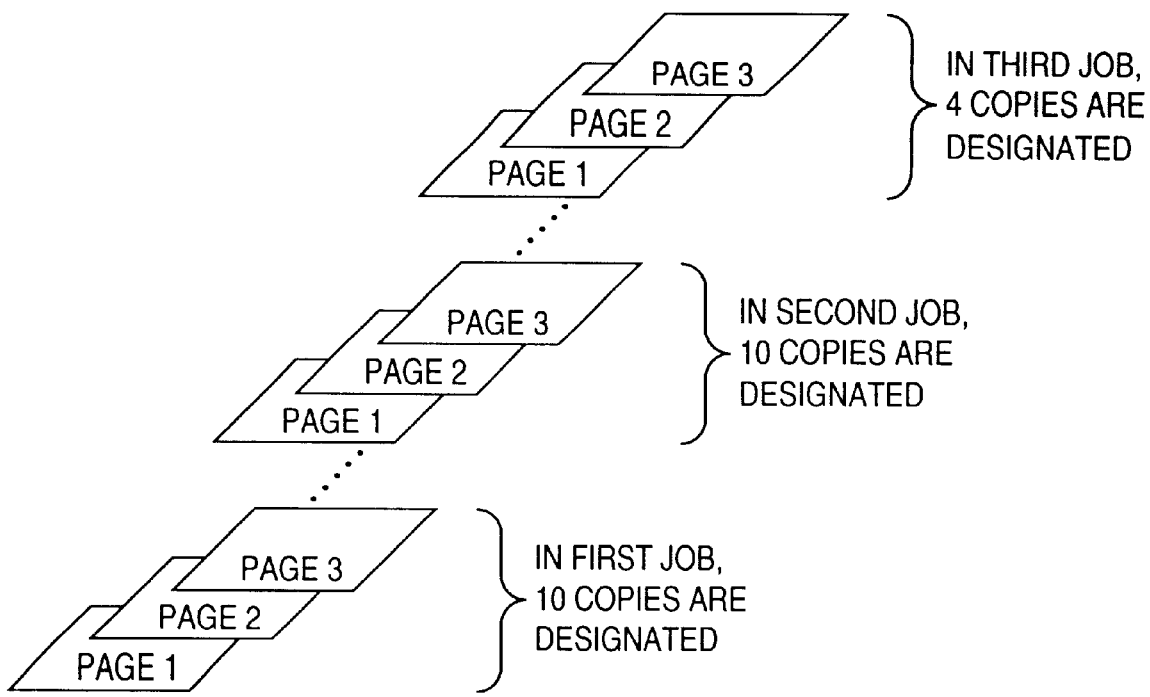
FIG. 13 is a view showing an output example using the host computer according to the first embodiment of the resent invention.

FIG. 13 shows an example of processing in the first embodiment when the printer limit is 10 copies, and a user designates 24 copies in printing a 3-page document. The number J of print jobs is 3 by rounding up 24/10=2.4. In the first and second print jobs, 10 copies as the upper printer limit are designated and printed. In the final, third print job, four copies as the remainder of division of 24 by 10 are designated and printed.

In FIG. 12, the number of copies in the final print job is special and set to N. However, the N copies may be printed in the first print job or intermediate print job.

This processing makes it possible to print the designated number of copies exceeding the printer limit number of copies. When the user prints a plurality of copies in this arrangement while designating punching, the user-designated number of copies can be obtained while being punched regardless of the printer limitation.

When the user designates to sort a plurality of copies in units of copies in this arrangement, the user-designated number of copies can be sorted in units of copies regardless of the printer limitation.

When the user prints a plurality of copies in this arrangement while designating another sorting, sorted copies desired by the user can be obtained regardless of the printer limitation.

(Second Embodiment)

Figure 14:
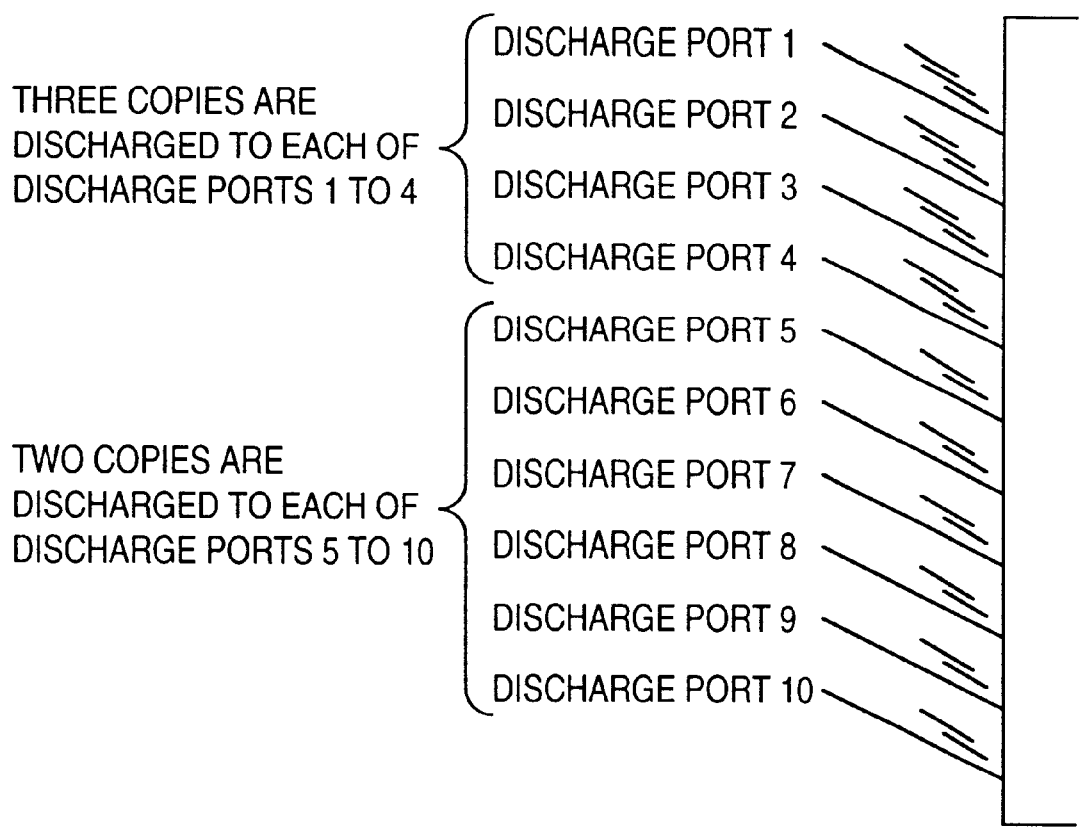
FIG. 14 is a view showing an output state when the host computer according to the first embodiment is used for a printer having a plurality of media discharge ports.

In the printer system according to the first embodiment, when a user designates and prints the number of copies exceeding the printer limit, the number of copies designated to repeat printing J times is set to the printer limit number of copies. When processing explained in the first embodiment is executed using a printer which has a plurality of media discharge ports and performs printing in units of copies by switching the media discharge ports, the printer limit number of copies is generally equal to the number of media discharge ports. In this case, for example, to print 24 copies by a printer having 10 media discharge ports, three copies are discharged to each of media discharge ports 1 to 4, and two copies are discharged to each of media discharge ports 5 to 10, as shown in FIG. 14. In many cases, however, occupying all the media discharge ports is undesirable. For example, some media discharge ports may be already occupied by other print jobs, or a hybrid machine must keep some media discharge ports free for facsimile reception.

Figure 15:
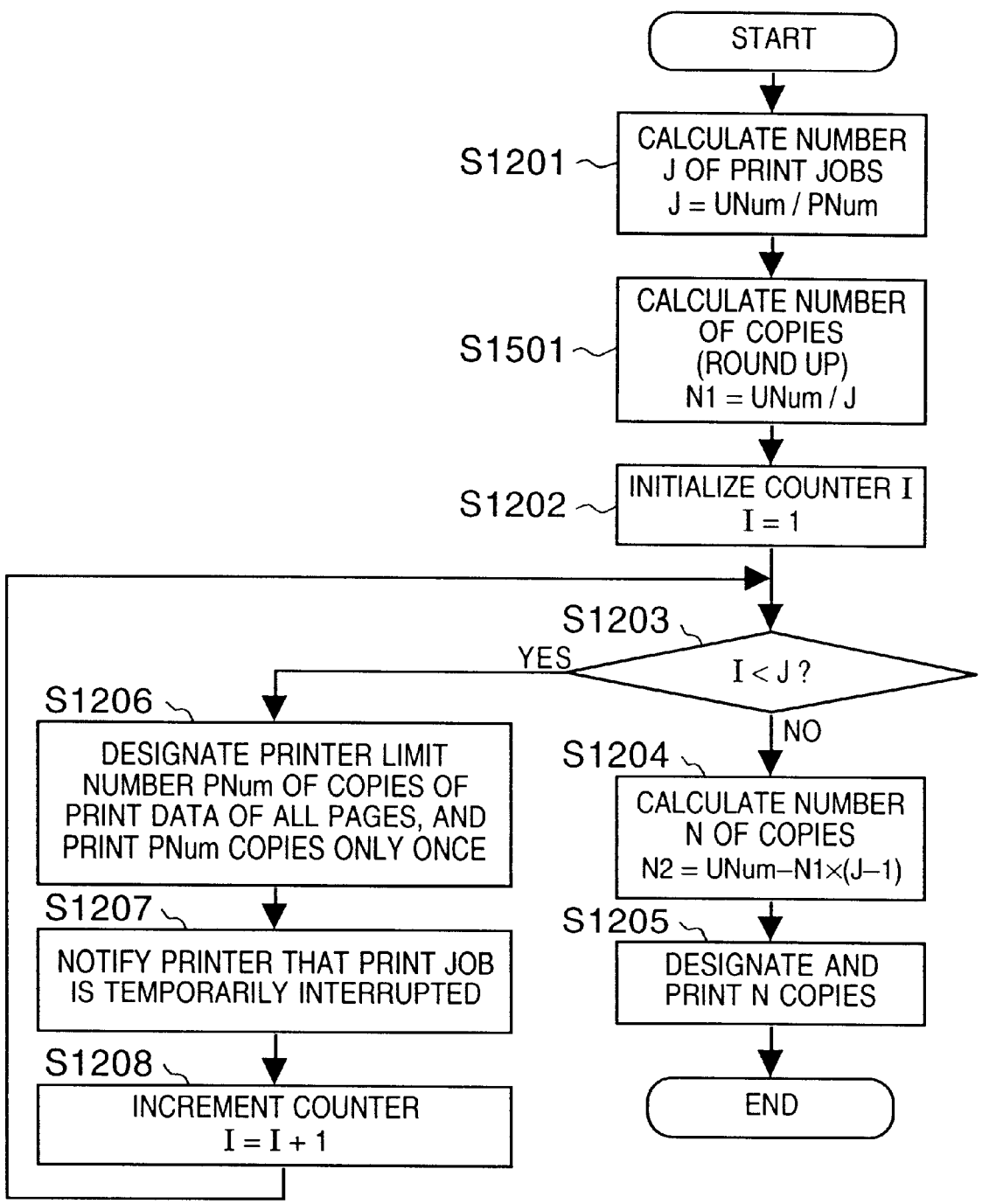
FIG. 15 is a flow chart showing processing of a print system, including a host computer, according to the second embodiment of the present invention.

For this reason, print processing of avoiding occupation of media discharge ports is also preferable. FIG. 15 is a flow chart showing this print processing. Since most of processing in FIG. 15 is the same as that shown in FIG. 12, the same reference numerals denote the same steps, and a description thereof will be omitted. Further, since the arrangement and operation except for this processing are the same as in the first embodiment, a description thereof will be omitted.

The number J of print jobs is calculated in step S1201, and then the number of copies is calculated in step S1501. In this case, a value obtained by rounding up to one decimal place of UNum/J is defined as the number N1 copies, and printing of N1 copies is repeated (J−1) times.

In step S1206, only N1 copies calculated in step S1501 are printed. In step S1204, a value N2 calculated by N2=UNum−N1×(J−1) is defined as the number of copies to be printed last.

Figure 16:
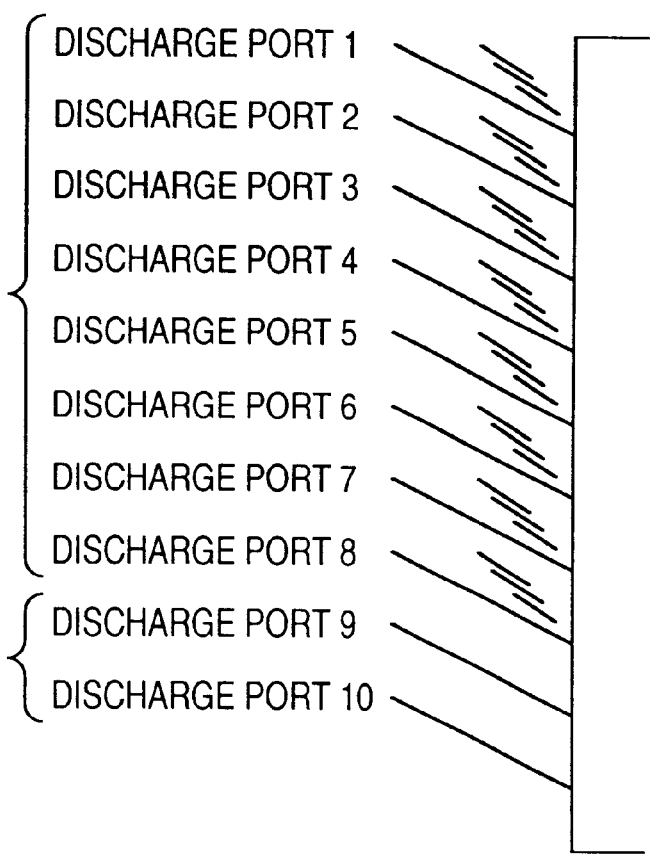
FIG. 16 is a view showing an output state when processing is done by a print system, including the host computer, according to the second embodiment of the present invention.

Similar to the first embodiment, when a user designates 24 copies for a printer limit of 10 copies, J=3, N1=24/3=8, and N2=24−8×(3−1)=8. As a result, only eight media discharge ports are occupied at most, as shown in FIG. 16.

In this manner, variations of the algorithms for designating the number of print jobs and the number of copies per print job also fall within the spirit and scope of the present invention.

(Third Embodiment)

Figure 17:
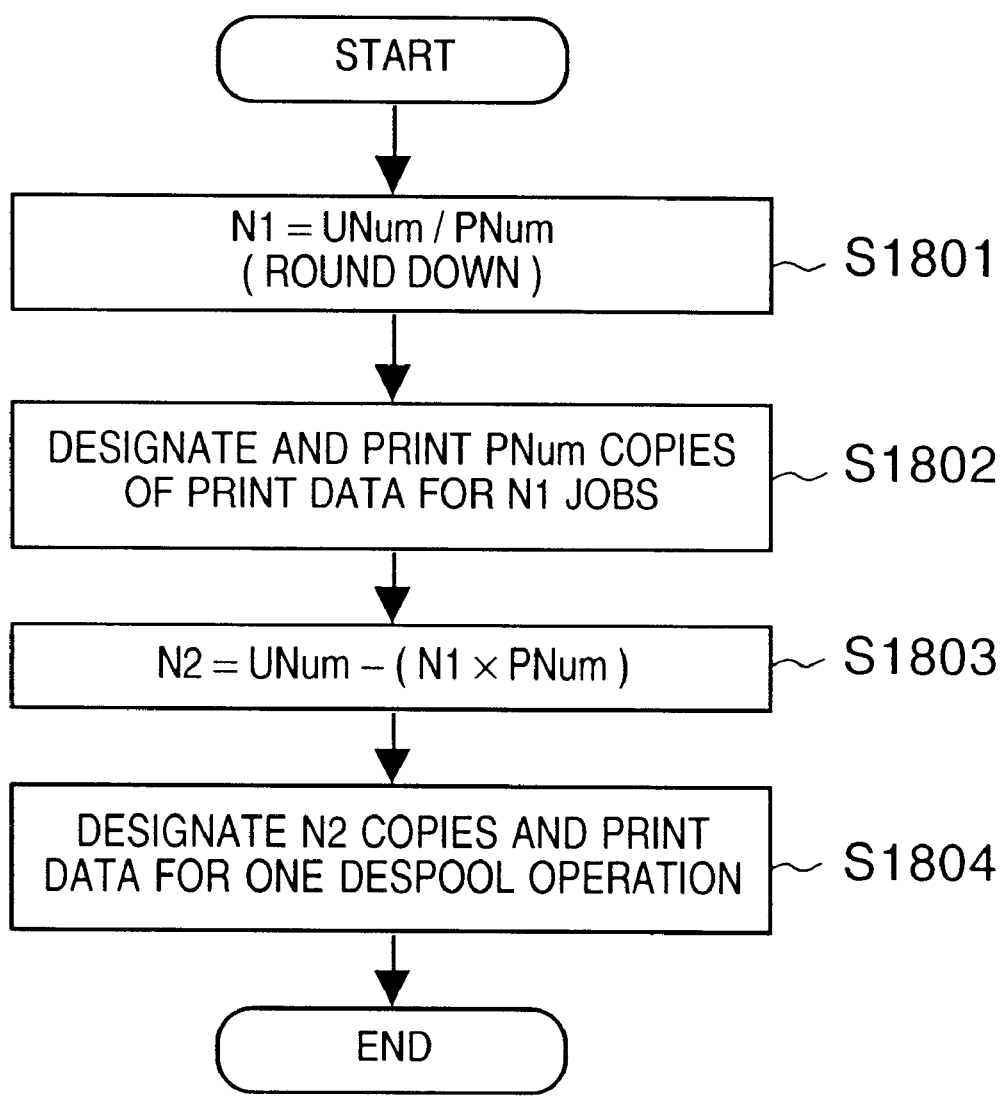
FIG. 17 is a flow chart showing processing of a print system, including a host computer, according to the third embodiment of the present invention.

In both the first and second embodiments, a user-recognized print unit is equal to a unit of one actual print job (both the units include 1, 2, and 3). Alternatively, an algorithm shown in the flow chart of FIG. 17 may be adopted as the third embodiment. The remaining arrangement and operation are the same as in the first embodiment, a description thereof will be omitted.

In step S1801, the repetitive number of print jobs, i.e., the number of despool operations is calculated. In this case, the number of despool operations is set to a quotient (omitting decimals) obtained by dividing a user-designated number of copies by the limit number of copies printable by one print job of the printer.

In step S1802, print data despooled by the number of despool operations calculated in step S1801 is set as one copy. A job designating to print the print data by the printer limit number of copies is transferred to the printer to cause the printer to print the print data.

In step S1803, the difference between the total number of copies (the number of actual copies: N1×PNum) printed in step S1802, and the user-designated number (UNum) of copies is calculated.

In step S1804, a job designating the calculated difference for print data by one despool operation is transferred to the printer to cause the printer to print the print data again.

Figure 18:
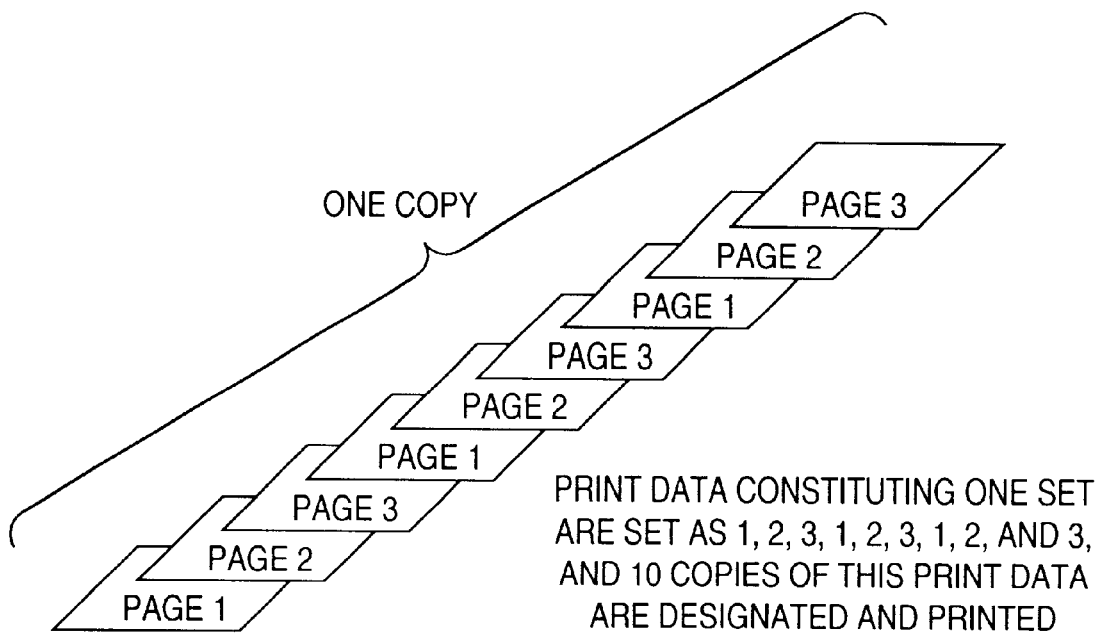
FIG. 18 is a view for explaining an output from the print system, including the host computer, according to the third embodiment of the present invention.
Figure 19:
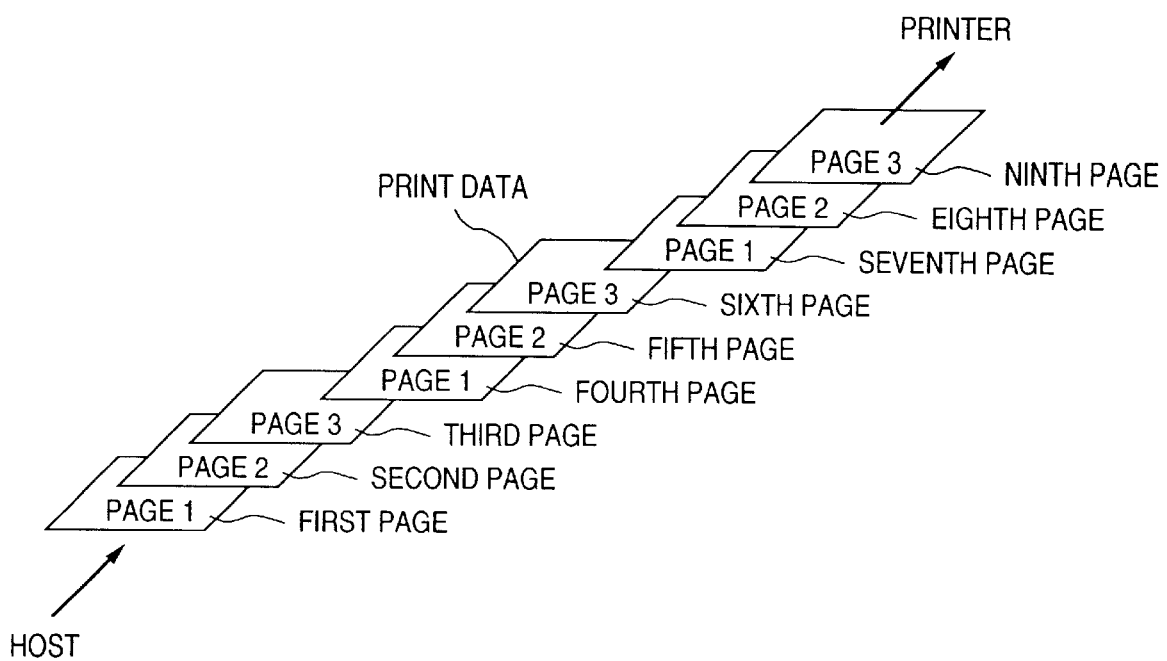
FIG. 19 is a view for explaining data transfer from a conventional host computer to a printer.

The case in which a user designates 30 copies of a 3-page document, and the printer limit is 10 copies will be exemplified. The number of despool operations is 30/10=3. After designating 10 copies as the printer limit, the host transfers one print unit of 1, 2, 3, 1, 2, 3, 1, 2, and 3 serving as print data by three despool operations, as shown in FIG. 18. That is, the print unit is changed to 9 pages, 9-page print data is set as one unit, and 10 copies are printed.

In this way, the print unit is changed to a format different from the original data unit (unit of spooled print data), and then print processing is performed to avoid the printer limit. This also falls within the spirit and scope of the present invention.

Note that the third embodiment assumes that the same print data is not repetitively spooled, and a user-recognized print unit is equal to a spooled print unit. Alternatively, the print unit may be changed by changing not the number of despool operations but spooled data.

In calculating the number of despool operations in step S1801, a user-designated number of copies is divided by the printer limit number of copies. As described in the second embodiment, the number of despool operations may be calculated by dividing the user-designated number of copies by the printer limit number of copies or less In this case, the user-designated number of copies may be divided by the number of media discharge ports substantially dischargeable so long as the limit number is the number of media discharge ports.

(Fourth Embodiment)

The first embodiment uses the number of media discharge ports as the limit of a printer having a plurality of media discharge ports. In practice, the number of physical media discharge ports may be different from the printer limit.

For example, when three media discharge ports are used by another print job in a printer having 10 media discharge ports, the number of actually usable media discharge ports is seven.

When a user designates usable media discharge ports, the number of designated media discharge ports is the printer limit.

In these cases, information on the positions of usable media discharge ports must be obtained in obtaining the printer limit. When a user limits the user of media discharge ports, media discharge ports used for printing can be obtained using a table which is looked up for usable media discharge ports from a user name.

Designation of media discharge ports in printing can be controlled using a method such as a conventional one using a job command language.

(Other Embodiments)

As far as the functions of the present invention are executed, the present invention may be applied to an apparatus comprising a single device (e.g., a copying machine, printer, or facsimile apparatus), a system constituted by a plurality of devices (e.g., a host computer, interface device, reader, and printer), or a system which performs processing while being connected via a network such as a LAN (Local Area Network) or WAN (Wide Area Network).

The object of the present invention is realized even by causing a computer (or a CPU or MPU) of a system or apparatus to readout and execute program codes stored in a storage medium storing software program codes for realizing the functions of the above-described embodiments.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magneto optical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A print control method for generating a job to be sent to a printer, the method comprising:
   a designation step of a user designating a number of copies;
   a recognition step of recognizing a limit number of copies printable in the printer by one print operation;
   a spooling step of spooling a print command inputted from a host unit; and
   a print control step of generating a plurality of jobs by converting the spooled print command into print control language so as to make a number of copies printed by one job be not more than the limit number of copies recognized in the recognition step.

2. The method according to claim 1, wherein the print control step comprises generating a plurality of jobs so as to make a total number of copies printed by the plurality of jobs equal to the number of copies designated in the designation step.

3. The method according to claim 2, wherein the print control step comprises:
   a comparison step of comparing a designated number UNum of copies designated by the user in the designation step with a limit number PNum of copies recognized in the recognition step; and
   a job generation step of, when the designated number UNum of copies is larger than the limit number PNum of copies as a result of comparison in the comparison step, generating N1 jobs for printing the limit number PNum of copies and one job for printing N2 copies on the basis of a quotient N1 and remainder N2 of division of UNum by PNum.

4. The method according to claim 3, wherein the job generation step comprises, when the designated number UNum of copies is larger than the limit number PNum of copies as a result of comparison between the designated number UNum of copies and the limit number PNum of copies, calculating the quotient N1 and remainder N2 of division of UNum by PNum, and when N2 is not 0, generating (N1+1) jobs for printing N3 copies and one job for printing N4 copies on the basis of a quotient N3 and remainder N4 of division of UNum by (N1+1).

5. The method according to claim 1,
   wherein the designation step comprises allowing the user to further designate print data, and
   wherein the print control step comprises:
      a print data generation step of combining a plurality of print data designated by the user in the designation step to generate one pseudo print data; and
      a job generation step of generating a job for printing the limit number of copies of the pseudo print data.

6. The method according to claim 1, wherein the print control step comprises:
   a comparison step of comparing the designated number UNum of copies designated by the user in the designation step with the limit number PNum of copies recognized in the recognition step; and
   a job generation step of, when the designated number UNum of copies is larger than the limit number PNum of copies as a result of comparison in the comparison step, generating pseudo print data having a run length N1 of print data designated by the user in the designation step on the basis of a quotient N1 and remainder N2 of division of UNum by PNum, and generating one job for printing PNum copies of the pseudo print data and one job for printing N2 copies of the print data designated by the user.

7. The method according to claim 1, wherein the limit number of copies is the number of media discharge ports of a printer.

8. The method according to claim 1, wherein the limit number of copies is the number of available media discharge ports out of all media discharge ports of a printer.

9. The method according to claim 1, wherein the designation step comprises allowing the user to designate a media discharge port, and the limit number of copies is the number of media discharge ports designated by the user in the designation step.

10. A print control apparatus for generating a job to be sent to a printer, said apparatus comprising:

designation means for enabling a user to designate a number of copies;

recognition means for recognizing a limit number of copies printable in the printer by one print operation;

spooling means for spooling a print command inputted from a host unit; and print control means for dividing, by converting the spooled print command into print control language, print data designated by said designation means into a plurality of jobs each for printing a number of copies not more than the limit number of copies recognized by said recognition means, and for controlling printing so as to print the number of copies designated by said designation means in the plurality of jobs.

11. The apparatus according to claim 10, wherein said print control means comprises:

comparison means for comparing a designated number UNum of copies designated by the user using said designation means with a limit number PNum of copies recognized by said recognition means; and job generation means for, when the designated number UNum of copies is larger than the limit number PNum of copies as a result of comparison by said comparison means, dividing UNum by PNum to obtain a quotient N1 and remainder N2, and generating N1 jobs for printing the limit number PNum of copies and one job for printing N2 copies.

12. The apparatus according to claim 11, wherein when the designated number UNum of copies is larger than the limit number PNum of copies as a result of comparison between the designated number UNum of copies and the limit number PNum of copies, said job generation means calculates the quotient N1 and remainder N2 of division of UNum by PNum, and when N2 is not 0, generates (N1+1) jobs for printing N3 copies and one job for printing N4 copies on the basis of a quotient N3 and remainder N4 of division of UNum by (N1+1).

13. The apparatus according to claim 10, wherein the limit number of copies is the number of media discharge ports of a printer.

14. The apparatus according to claim 10, wherein the limit number of copies is the number of available media discharge ports out of all media discharge ports of a printer.

15. The apparatus according to claim 10, wherein said designation means allows the user to designate a media discharge port, and the limit number of copies is the number of media discharge ports designated by the user using said designation means.

16. A print control apparatus for generating a job to be sent to a printer, said apparatus comprising:

designation means for enabling a user to designate print data and a number of copies of the print data;

recognition means for recognizing a limit number of copies printable in the printer by one print operation;

spooling means for spooling a print command inputted from a host unit; and print control means for combining a plurality of print data designated by the user using said designation means to generate one pseudo print data, and for generating a plurality of jobs by converting the spooled print command into print control language for printing the limit number of copies of the pseudo print data.

17. The apparatus according to claim 16, wherein said print control means comprises:

comparison means for comparing a designated number UNum of copies designated by the user using said designation means with a limit number PNum of copies recognized by said recognition means; and job generation means for, when the designated number UNum of copies is larger than the limit number PNum of copies as a result of comparison by said comparison means, generating pseudo print data having a run length N1 of print data designated by the user using said designation means on the basis of a quotient N1 and remainder N2 of division of UNum by PNum, and generating one job for printing PNum copies of the pseudo print data and one job for printing N2 copies of the print data designated by the user.

18. The apparatus according to claim 16, wherein the limit number of copies is the number of media discharge ports of a printer.

19. The apparatus according to claim 16, wherein the limit number of copies is the number of available media discharge ports out of all media discharge ports of a printer.

20. The apparatus according to claim 16, wherein said designation means allows the user to designate a media discharge port, and the limit number of copies is the number of media discharge ports designated by the user using said designation means.

21. A computer-readable memory storing a control program for generating a job to be sent to a printer, the control program comprising:

code of designation program of inputting a number of copies designated by a user;

code of a recognition program of recognizing a limit number of copies printable in the printer by one print operation;

code of a spooling program of spooling a print command inputted from a host unit; and code of a print control program of dividing, by converting the spooled print command into print control language, print data into a plurality of jobs each for printing a number of copies not more than the limit number of copies recognized by the recognition program, and controlling printing.

22. The memory according to claim 21, wherein the print control program comprises:

a comparison program of comparing a designated number UNum of copies designated by the user using the designation program with a limit number PNum of copies recognized by the recognition program; and a job generation program of, when the designated number UNum of copies is larger than the limit number PNum of copies as a result of comparison by the comparison program, generating N1 jobs for printing the limit number PNum of copies and one job for printing N2 copies on the basis of a quotient N1 and remainder N2 of division of UNum by PNum.

23. The memory according to claim 22, wherein the job generation program comprises, when the designated number UNum of copies is larger than the limit number PNum of copies as a result of comparison between the designated number UNum of copies and the limit number PNum of copies, calculating a quotient N1 and remainder N2 of division of UNum by PNum, and when N2 is not 0, generating (N1+1) jobs for printing N3 copies and one job for printing N4 copies on the basis of a quotient N3 and remainder N4 of division of UNum by (N1+1).

24. The memory according to claim 21, wherein the limit number of copies is the number of all media discharge ports of a printer.

25. The memory according to claim 21, wherein the limit number of copies is the number of effective media discharge ports out of all media discharge ports of a printer.

26. The memory according to claim 21, wherein the designation program comprises allowing the user to designate a media discharge port, and the limit number of copies is the number of media discharge ports designated by the user using the designation program.

27. A computer-readable memory storing a control program for generating a job to be sent to a printer, the control program comprising:
   code of a designation program of inputting print data and a number of copies of the print data designated by a user;
   code of a recognition program of recognizing a limit number of copies printable in the printer by one print operation;
   code of a spooling program of spooling a print command inputted from a host unit; and
   code of a print control program of combining a plurality of print data designated by the user using the designation program to generate one pseudo print data, and generating a plurality of jobs by converting the spooled print command into print control language for printing the limit number of copies of the pseudo print data.

28. The memory according to claim 27, wherein the print control program comprises:
   a comparison program of comparing a designated number UNum of copies designated by the user using the designation program with a limit number PNum of copies recognized by the recognition program; and
   a job generation program of, when the designated number UNum of copies is larger than the limit number PNum of copies as a result of comparison by the comparison program, generating pseudo print data having a run length N1 of print data designated by the user using the designation program on the basis of a quotient N1 and remainder N2 of division of UNum by PNum, and generating one job for printing PNum copies of the pseudo print data and one job for printing N2 copies of the print data designated by the user.

29. The memory according to claim 27, wherein the limit number of copies is the number of media discharge ports of a printer.

30. The memory according to claim 27, wherein the limit number of copies is the number of available media discharge ports out of all media discharge ports of a printer.

31. The memory according to claim 27, wherein the designation program comprises allowing the user to designate a media discharge port, and the limit number of copies is the number of media discharge ports designated by the user using the designation program.

32. A computer program product embodying a program for implementing a print control method for generating a job to be sent to a printer, the program comprising:
   program code for a designation step of a user designating a number of copies;
   program code for a recognition step of recognizing a limit number of copies printable in the printer by one print operation;
   program code for a spooling step of spooling a print command inputted from a host unit; and
   program code for a print control step of generating a plurality of jobs by converting the spooled print command into print control language so as to make the number of copies printed by one job be not more than the limit number of copies recognized in the recognition step.

33. A print control method for generating a job to be sent to a printer, the method comprising:
   an input step of inputting a number of copies designated by a user;
   a recognition step of recognizing a limit number of copies printable by the printer in one print operation, the limit number of copies corresponding to a number of available media discharge ports of the printer; and
   a print control step of generating a plurality of jobs by converting a print command into print control language so as to make a number of copies printed in one one job be not more than the limit number of copies recognized in the recognition step.

34. The method according to claim 33, wherein the print control step includes generating a plurality of jobs so as to make a total number of copies printed by the plurality of jobs equal to the number of copies designated in the input step.

35. The method according to claim 34, wherein the print control step comprises:
   a comparison step of comparing a designate number Unum of copies designated by the user in the input step with a limit number PNum of copies recognized in the recognized step; and
   a job generation step of, when the designated number UNum of copies is larger than the limit number PNum of copies as a result of comparison in the comparison step, generating N1 jobs for printing the limit number PNum of copies and one job for printing N2 copies based on a quotient N1 and remainder N2 of division of UNum by PNum.

36. The method according to claim 35, wherein the job generation step includes, when the designated number UNum of copies is larger than the limit number PNum of copies as a result of comparison between the designated number UNum of copies and the limit number PNum of copies, calculating the quotient N1 and remainder N2 of division of UNum by PNum, and when N2 is not 0, generating (N1+1) jobs for print N3 copies and one job for print N4 copies for printing N4 copies based on a quotient N3 and remainder N4 of division of UNum by (N1+1).

37. The method according to claim 33,
   wherein the input step includes allowing the user to further designate print data, and
   wherein the print control step comprises:
      a print data generation step of combining a plurality of print data designated by the user in the input step to generate one pseudo print data; and
      a job generation step of generating a job for printing the limit number of copies of the pseudo print data.

38. The method according to claim 33, wherein the print control step comprises:
   a comparison step of comparing a designated number UNum of copies designated by the user in the input step with a limit number PNum of copies recognized in the recognition step; and
   a job generation step of, when the designated number UNum of copies is larger than the limit number PNum of copies as a result of comparison in the comparison step, generating pseudo print data having a run length N1 of print data designated by the user in the input step based on a quotient N1 and remainder N2 of division of UNum by PNum, and generating one job for printing PNum copies of the pseudo print data and one job for printing N2 copies of the print data designated by the user.

39. The method according to claim 33, wherein the input step includes allowing the user to designate one or more media discharge ports, and the limit number of copies is a number of media discharge ports deisgnated by the user in the input step.

40. A print apparatus that generates a job to be sent to a print, the apparatus comprising:

an input unit arranged to input a number of copies designated by a user;

a recognition unit arranged to recognize a limit number of copies printable by the printer in one print operation, the limit number of copies corresponding to a number of available media discharge ports of the printer; and a print control unit arranged to generate a plurality of jobs by converting a print command into print control language so as to make a number of copies printed in one job be not more than the limited number of copies recognized in the recognition unit.

41. A computer-readable storage medium storing a program for implementing a print control method for generating a job to be sent to a printer, the program comprising;

code for an input step of inputting a number of copies designated by a user;

code for a recognition step of recognizing a limit number of copies printable by the printer in one print operation, the limit number of copies corresponding to a number of available media discharge ports of the printer; and code for a print control step of generating a plurality of jobs by converting a print command into print control language so as to make a number of copies printed in one job be not more than the limit number of copies recognized in the recognition step.

42. A computer program product embodying a program for implementing a print control method for generating a job to be sent to a print, the program comprising:

code for an input step of inputting a number of copies designated by a user;

code for a recognition step of recognizing a limit number of copies printable by the printer in one print operation, the limit number of copies corresponding to a number of available media discharge ports of the printer; and code for a print control step of generating a plurality of jobs by converting a print command into print control language so as to make a number of copies printed in one job be not more than the limit number of copies recognized in the recognition step.

\* \* \* \* \*

UNITED STATES PATENT AND TRADEMARK OFFICE
CERTIFICATE OF CORRECTION

PATENT NO.    : 6,337,961 B2
DATED         : January 8, 2002
INVENTOR(S)   : Yasuo Mori et al.

It is certified that error appears in the above-identified patent and that said Letters Patent is hereby corrected as shown below:

Column 3,
Line 23, "resent" should read -- present --.

Column 8,
Line 3, "INFO instep" should read -- If No in step --.

Column 12,
Line 54, "less In" should read -- less. In --.

Column 18,
Line 19, "designate" should read -- designated --.
Line 20, "Unum" should read -- UNum --.
Line 22, "recognized" should read -- recognition --.
Line 37, "print" should read -- printing --.
Line 38, "print N4 copies for printing" should read -- printing --.

Column 19,
Line 5, "print," should read -- printer, --.

Column 20,
Line 10, "print." should read -- printer, --.

Signed and Sealed this

Twenty-first Day of May, 2002

Attest:

JAMES E. ROGAN
Attesting Officer         Director of the United States Patent and Trademark Office